(12) United States Patent
Chen et al.

(10) Patent No.: US 11,354,929 B2
(45) Date of Patent: Jun. 7, 2022

(54) FINGERPRINT RECOGNITION DEVICE

(71) Applicant: INDUSTRIAL TECHNOLOGY RESEARCH INSTITUTE, Hsinchu (TW)

(72) Inventors: Ping-Chen Chen, Zhubei (TW); Cheng-Hsuan Lin, Zhudong Township (TW); Yu-Ling Hsu, Taipei (TW); Ding-Zheng Lin, Taipei (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 154 days.

(21) Appl. No.: 16/867,962

(22) Filed: May 6, 2020

(65) Prior Publication Data

US 2020/0265209 A1 Aug. 20, 2020

Related U.S. Application Data

(62) Division of application No. 15/884,836, filed on Jan. 31, 2018, now Pat. No. 10,699,098.

(30) Foreign Application Priority Data

Dec. 12, 2017 (TW) .................................. 106143499

(51) Int. Cl.
*G06K 9/00* (2022.01)
*G06V 40/13* (2022.01)
(Continued)

(52) U.S. Cl.
CPC ........ *G06V 40/1318* (2022.01); *G02F 1/1368* (2013.01); *G02F 1/133603* (2013.01);
(Continued)

(58) Field of Classification Search
CPC .. G06K 9/0004; G06K 9/2018; G06K 9/2027; G02F 1/133603; G02F 1/1368; G02F 1/133614
See application file for complete search history.

(56) References Cited

U.S. PATENT DOCUMENTS 8,335,353 B2 12/2012 Yamamoto et al.
8,792,174 B2 7/2014 Schmaelzle et al.
(Continued)

FOREIGN PATENT DOCUMENTS

CN 102440760 A 5/2012
CN 101652797 B 4/2013
(Continued)

OTHER PUBLICATIONS

Chinese Office Action and Search Report for Chinese Application No. 201711414696.2, dated Jul. 17, 2020.
(Continued)

*Primary Examiner* — Solomon G Bezuayehu
(74) *Attorney, Agent, or Firm* — Birch, Stewart, Kolasch & Birch, LLP

(57) ABSTRACT

A fingerprint recognition device includes a light source, a light conversion layer, a light detector, and a light filter. The light source is configured to emit a first light having a first wavelength. The light conversion layer is configured to convert the first light to a second light having a second wavelength different from the first wavelength. The light detector is configured to detect the second light reflected by a fingerprint. The light filter is disposed between the light conversion layer and the light detector, and configured to substantially filter out the first light and substantially pass the second light.

14 Claims, 11 Drawing Sheets

(51) Int. Cl.
   *G02F 1/1368*    (2006.01)
   *G02F 1/13357*   (2006.01)
   *G06V 10/141*    (2022.01)
   *G06V 10/143*    (2022.01)
   *G02F 1/1335*    (2006.01)

(52) U.S. Cl.
   CPC .......... *G06V 10/141* (2022.01); *G06V 10/143* (2022.01); *G02F 1/133614* (2021.01)

(56) References Cited

U.S. PATENT DOCUMENTS

| | | | |
|---|---|---|---|
| 2008/0123908 A1 | 5/2008 | Waldman et al. | |
| 2013/0120760 A1 | 5/2013 | Raguin et al. | |
| 2016/0117543 A1 | 4/2016 | Huang et al. | |
| 2016/0148036 A1 | 5/2016 | Kim et al. | |
| 2016/0266695 A1* | 9/2016 | Bae | G06V 40/1318 |
| 2016/0328090 A1 | 11/2016 | Klinghult | |
| 2016/0342282 A1 | 11/2016 | Wassvik | |
| 2017/0092890 A1 | 3/2017 | Seo et al. | |
| 2017/0124376 A1 | 6/2017 | Wyrwas et al. | |
| 2017/0206395 A1* | 7/2017 | Chang | G06V 40/1318 |
| 2017/0235995 A1* | 8/2017 | Han | G06V 10/141 382/124 |
| 2017/0300736 A1* | 10/2017 | Song | G06V 40/1312 |
| 2018/0018495 A1 | 1/2018 | Hung et al. | |
| 2018/0076394 A1 | 3/2018 | Kawakami et al. | |
| 2019/0102016 A1 | 4/2019 | Kim et al. | |
| 2019/0180070 A1* | 6/2019 | Chen | G06V 40/1318 |
| 2020/0117879 A1* | 4/2020 | Li | G02B 6/001 |
| 2020/0265205 A1* | 8/2020 | Wang | G06V 10/141 |
| 2020/0401781 A1* | 12/2020 | Haddad | G06V 40/1359 |

FOREIGN PATENT DOCUMENTS

| | | |
|---|---|---|
| CN | 104205398 A | 12/2014 |
| CN | 104794461 A | 7/2015 |
| CN | 105844212 A | 8/2016 |
| CN | 105868714 A | 8/2016 |
| CN | 106529513 A | 3/2017 |
| CN | 106778624 A | 5/2017 |
| CN | 206515839 U | 9/2017 |
| CN | 107305411 A | 10/2017 |
| CN | 107451513 A | 12/2017 |
| EP | 0 411 221 A1 | 2/1991 |
| EP | 1 830 123 B1 | 4/2012 |
| TW | I514286 B | 12/2015 |
| TW | I501163 B | 9/2016 |
| TW | I550524 B | 9/2016 |
| TW | I552091 B | 10/2016 |
| WO | WO 2013/071311 A1 | 5/2013 |

OTHER PUBLICATIONS

Liu et al., "All-quantum-dot emission tuning and multicolored optical films using layer-by-layer assembly method," Elsevier, Chemical Engineering Journal, 2017, vol. 324, pp. 19-25.

Qin et al., "Label-Free Electrochemical Imaging of Latent Fingerprints on Metal Surfaces," Electroanalysis, 2012, vol. 24, No. 5, pp. 1027-1032.

Wang et al., Transparent, flexible and luminescent composite films by incorporating CuInS2 based quantum dots into a cyanoethyl cellulose matrix,, RSC Advances, 2012, vol. 2, pp. 2675-2677.

Wu et al., "Dual-emitting quantum dot nanohybrid for imaging of latent fingerprints: simultaneous identification of individuals and traffic light-type visualization of TNT," Chem. Sci., 2015, vol. 6, pp. 4445-4450.

ZHU et al., "Highly transparent and colour-tunable composite films with increased quantum dot loading," J. Mater. Chem. C, 2014, vol. 2, pp. 10031-10036.

* cited by examiner

FINGERPRINT RECOGNITION DEVICE

This application is a divisional application of U.S. application Ser. No. 15/884,836, filed on Jan. 31, 2018, which claims the benefit of Taiwan application Serial No. 106143499, filed on Dec. 12, 2017. The entire content of which is incorporated herein by reference.

TECHNICAL FIELD

The present disclosure relates to a biometric recognition device. More particularly, the present disclosure relates to a fingerprint recognition device.

BACKGROUND

In various situations requiring confidentiality, to further enhance the security, biometric recognition may cooperate with or replace passwords and other conventional means of identification. As the development of biometric recognition, the application thereof also increases. According to a forecast by Transparency Market Research which is a market research firm, the compounded revenue growth rate in the biometrics market even exceeds 20% from 2012 to 2019. Among others, fingerprint recognition accounts for about 30% of the overall biometrics market due to its biological uniqueness, which ensures security, and ease of use. Due to the vigorous development of the market, various improvements have been conducted for biometric recognition means and devices, such as those for fingerprint recognition.

SUMMARY

In the present disclosure, a device structure that can be used to conduct biometric recognition is provided for the improvement of the recognition performance. It can be applicable in fingerprint recognition.

According to some embodiments, a fingerprint recognition device may comprise a light source, a light conversion layer, a light detector, and a light filter. The light source is configured to emit a first light having a first wavelength. The light conversion layer is configured to convert the first light to a second light having a second wavelength different from the first wavelength. The light detector is configured to detect the second light reflected by a fingerprint. The light filter is disposed between the light conversion layer and the light detector, and configured to substantially filter out the first light and substantially pass the second light.

Figure 1:
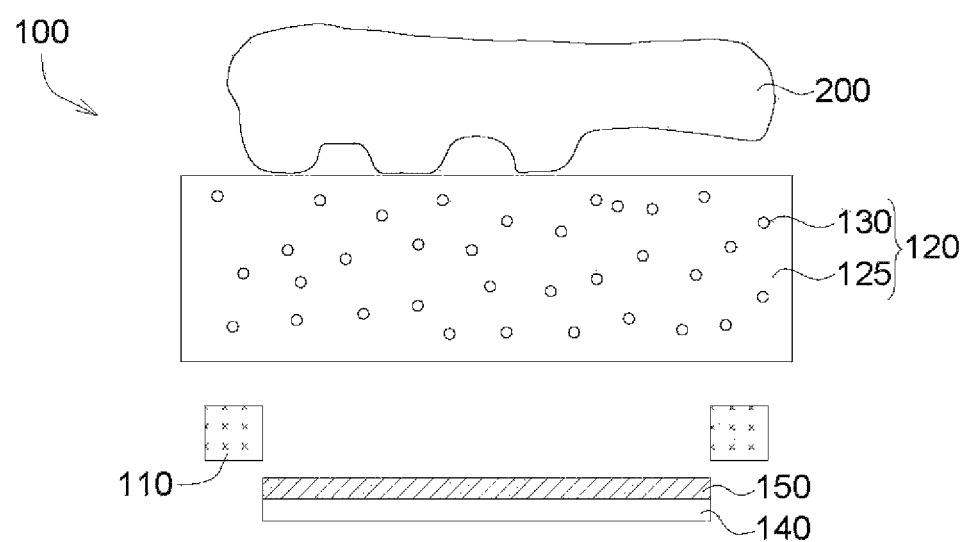
FIG. 1 illustrates an exemplary fingerprint recognition device.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Various embodiments will be described more fully hereinafter with reference to accompanying drawings, which are provided for illustration and explanation purposes but not limitation purpose. For clarity, the components in the figures may not be drawn to scale. In addition, some elements and reference numerals may be omitted in some figures. In this disclosure, the description directed to one element allows for the situations in which one or more element are used, unless clearly otherwise specified. It is contemplated that the elements and features of one embodiment may be beneficially incorporated in another embodiment without further recitation.

Figure 2A:
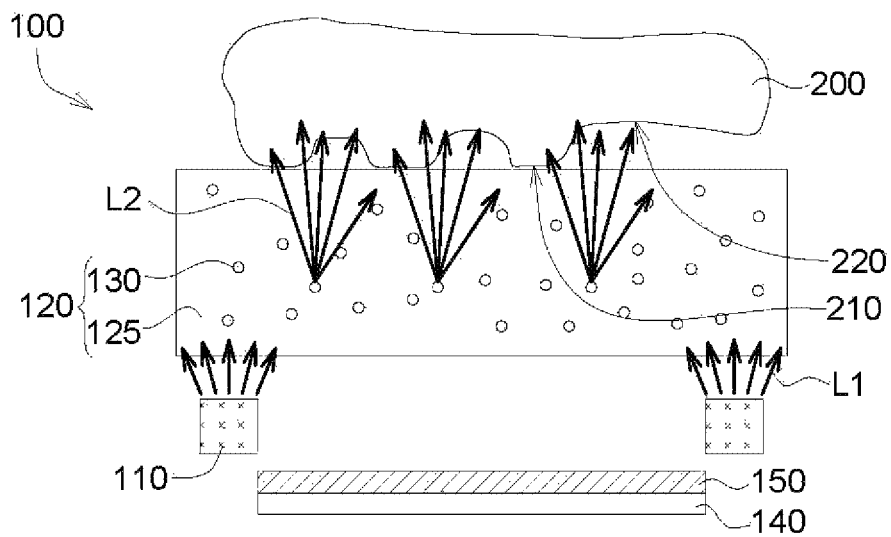
FIGS. 2A-2B illustrate the operation of the fingerprint recognition device as shown in FIG. 1.
Figure 2B:
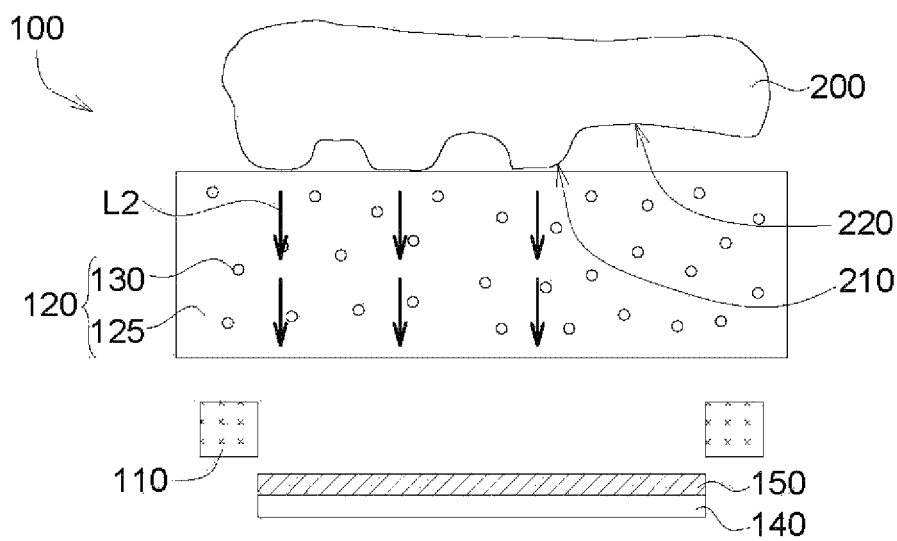

Referring to FIG. 1 and FIGS. 2A-2B, an exemplary fingerprint recognition device 100 is shown. The fingerprint recognition device 100 comprises a light source 110, a light conversion layer 120, a light detector 140, and a light filter 150. The light source 110 is configured to emit a first light L1. The first light L1 has a first wavelength λ1. The light conversion layer 120 is configured to convert the first light L1 to a second light L2. The second light L2 has a second wavelength λ2 different from the first wavelength λ1. The light detector 140 is configured to detect the second light L2 reflected by the fingerprint of a user's finger 200. The light filter 150 is disposed between the light conversion layer 120 and the light detector 140. The light filter 150 is configured to substantially filter out the first light L1 and substantially pass the second light L2. Herein, said substantially filter out the first light L1 and substantially pass the second light L2 does not require that the first light L1 is completely filtered out and the second light L2 is not lost at all, but merely require that most of the first light L1 is filtered and most of the second light L2 can pass through the filter 150. All the implementations that a distinguishability of the light filter 150 between the first light L1 and the second light L2 enough to provide a fingerprint image at the light detector 140 without an interference caused by the first light L1 are acceptable.

In the exemplary fingerprint recognition device 100, the light source 110 is disposed under the light conversion layer 120. According to some embodiments, the light source 110 may be a monochromatic light source. The suitable monochromatic light sources comprise, but not limited to, a light emitting diode (LED) light source, an electroluminescence (EL) cold light source, an organic light emitting diode (OLED) light source, and a cold cathode fluorescent lamp (CCFL) light source. It can be understood that, even that a monochromatic light source is used, the first light L1 may not be a light of a single wavelength. The first light L1 may have a light emission spectrum with a peak, and the first wavelength $\lambda 1$ can be the wavelength of highest emissivity in the light emission spectrum of the first light L1. Similarly, the second light L2 converted by the light conversion layer 120 may have a light emission spectrum with a peak, and the second wavelength $\lambda 2$ can be the wavelength of highest emissivity in the light emission spectrum of the second light L2.

According to some embodiments, as shown in FIG. 1, the light conversion layer 120 may comprise a medium 125 and light conversion particles 130 dispersed in the medium 125. According to some embodiments, the medium 125 may be formed of a thermosetting plastic or a thermoplastic, the suitable materials comprise, but not limited to, epoxy, phenolic resin, bismaleimide (BMI), nylon, polystyrene, polycarbonate, polyethylene, polypropylene, vinyl resin, and a semi-crystalline plastic or an amorphous plastic may be used. According to some embodiments, the light conversion particles 130 may be formed of at least one of a quantum dot material, an inorganic fluorescent material, an organic fluorescent material, and a phosphor material so as to excite the second light L2. The suitable quantum dot materials comprise, but not limited to, those with a core formed of CdSe, ZnSe, GaAs, or InP and a single shell or multi-shells formed of a material having an energy gap larger than the energy gap of the core, wherein the shell(s) encapsulate(s) the core. The suitable inorganic fluorescent materials comprise, but not limited to, YAG, InGaN, silicate, and combinations thereof. The suitable organic fluorescent materials comprise, but not limited to, naphthalene, anthracene, phenanthrene, fluoranthene, pyrene, 1,2-chrysene, 9,10-triphenylene, perylene, substituted aromatic derivatives thereof, and combinations of all the materials described above (including the derivatives). The suitable phosphor materials comprise, but not limited to, Flrpic, Flr6, UGH materials, and combinations thereof. According to some embodiments, the light conversion particles 130 have particle sizes smaller than the second wavelength $\lambda 2$. As such, the second light L2 from the finger 200 toward the light detector 140 will not be deflected by the light conversion particles 130, and thereby the clarity of fingerprint imaging can be ensured. In some embodiments, the particle sizes of the light conversion particles 130 are smaller than 10 nm. In some embodiments, suitable light conversion particles 130 can be used such that $\lambda 2 - \lambda 1 \geq 20$ nm. As such, it is easier for the light filter 150 to distinguish the second light L2 from the first light L1. The first light L1 is filtered out, while at the same time, most of the second light L2 that is actually used for fingerprint imaging is allowed to pass the filter 150 and be detected by the light detector 140.

For example, in some embodiments, the light source 110 emits a first light L1 with a wavelength in a range from 400 nm to 500 nm, and the light conversion layer 120 converts the first light L1 to a second light L2 with a wavelength in a range from 450 nm to 600 nm, such as by the light conversion particles 130. Further, a light filter 150 allowing for the passage of the light of a wavelength equal to or larger than 480 nm is used correspondingly. In some other embodiments, the light source 110 emits a first light L1 with a wavelength in a range from 520 nm to 530 nm, and the light conversion layer 120 converts the first light L1 to a second light L2 with a wavelength in a range from 600 nm to 700 nm, such as by the light conversion particles 130. Further, a light filter 150 allowing for the passage of the light of a wavelength equal to or larger than 600 nm is used correspondingly. However, the collocation of the components can be further adjusted as needed without particular limitations, as long as the arrangement does not depart from the scope of the disclosure.

According to some embodiments, the light detector 140 may be, but not limited to, a charge coupled device (CCD) sensor or a complementary metal oxide semiconductor (CMOS) sensor.

According to some embodiments, the light filter 150 has a first transmittance R1 at the first wavelength $\lambda 1$, the light filter 150 has a second transmittance R2 at the second wavelength $\lambda 2$, and R2−R1>50%. As such, it is easier for the light filter 150 to distinguish the second light L2 from the first light L1. The first light L1 is filtered out, while at the same time, the second light L2 is allowed to pass the filter 150 and be detected by the light detector 140.

Referring to FIGS. 2A-2B, specific operation of the fingerprint recognition device as shown in FIG. 1 is illustrated. As shown in FIG. 2A, the first light L1 emitted by the light source 110 arrives at the light conversion layer 120, and the first light L1 is converted to the second light L2 by the light conversion particles 130. For fingerprinting recognition, in addition to the quality of the detector used to detect the light reflected by the finger, the uniformity of the light (light uniformity) provided to the finger may also affect the fingerprint image. When said light uniformity is not good enough, uneven brightness is found in the formed image. In the fingerprint recognition device according to embodiments, through the arrangement of the light conversion layer 120, particularly the light conversion particles 130 therein, uniform light can be provided to the finger to be detected. The second light L2 arrives at the finger 200 of the user, and is reflected thereby. Since the light reflected by the valleys 220 is stronger than the light reflected by the ridges 210, a fingerprint image can be formed. As shown in FIG. 2B, the second light L2 reflected by the finger 200 passes downward through the light conversion layer 120 and the light filter 150, and the second light L2 is detected by the light detector 140. Because the particle sizes of the light conversion particles 130 are smaller than the second wavelength $\lambda 2$, even by an order of magnitude, the reflected second light L2 will not be deflected by the light conversion particles 130 when it passes through the light conversion layer 120. This ensure the clarity for the detection and imaging of the subsequent light detector 140. In contrast, micron-scale structures or scattering particles that scatter the light from the light source are the common means for increasing the light uniformity proved to the finger currently. However, these structures have sizes which even larger than the wavelengths of the light, and thereby the reflected light is also scattered, deflected, or otherwise affected. Such situations subsequently lead to the poor imaging performance.

Figure 3:
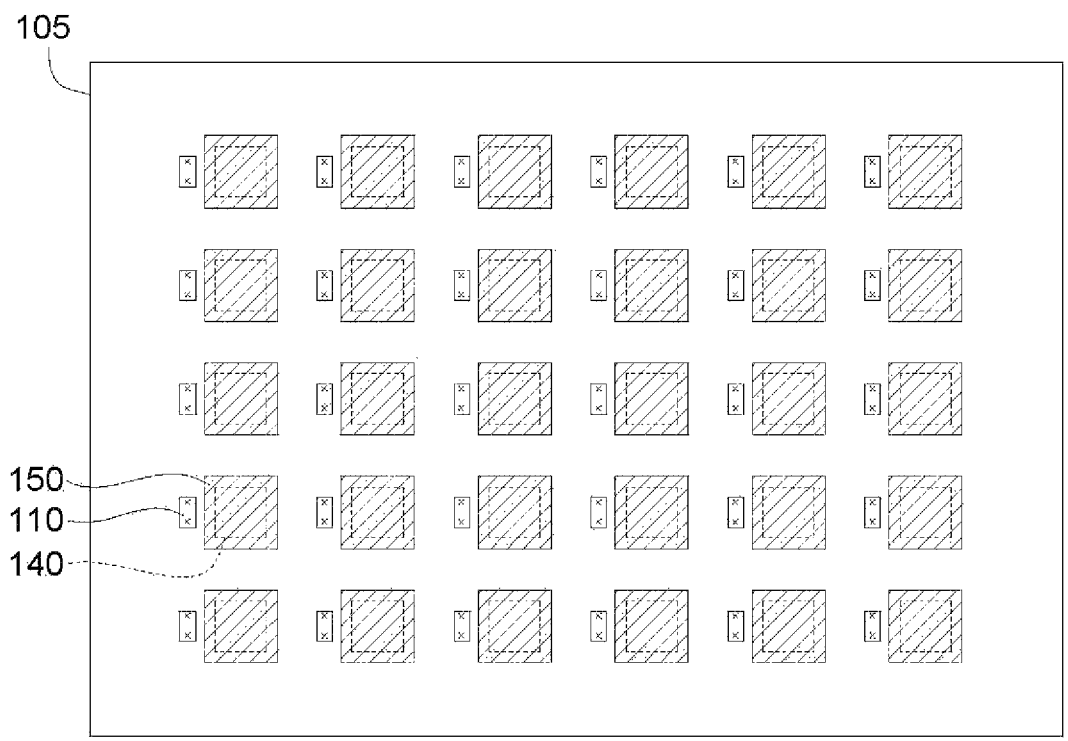
FIG. 3 illustrates an exemplary arrangement of the light source(s), the light detector(s), and the light filter.

In a fingerprint recognition device 100 in which the light source 110 is disposed under the light conversion layer 120 as shown in FIG. 1, the light source 110 and the light detector 140 may be manufactured together on a substrate such as, but not limited to, a wafer. Referring to FIG. 3, an exemplary arrangement of the light source 110, the light detector 140, and the light filter 150 under such situations is shown. As shown in FIG. 3, the fingerprint recognition device 100 may comprise a plurality of light sources 110 and a plurality of light detectors 140, and the light sources 110 and the light detectors 140 are disposed on a substrate 105 of the fingerprint recognition device 100. The light sources 110 and the light detectors 140 are individually arranged in columns (of a matrix), and the columns of the light sources 110 and the columns of the light detectors 140 are alternately disposed. In this arrangement, the light filter 150 may be disposed on the light detectors 140, and do not cover the light sources 110.

Figure 4:
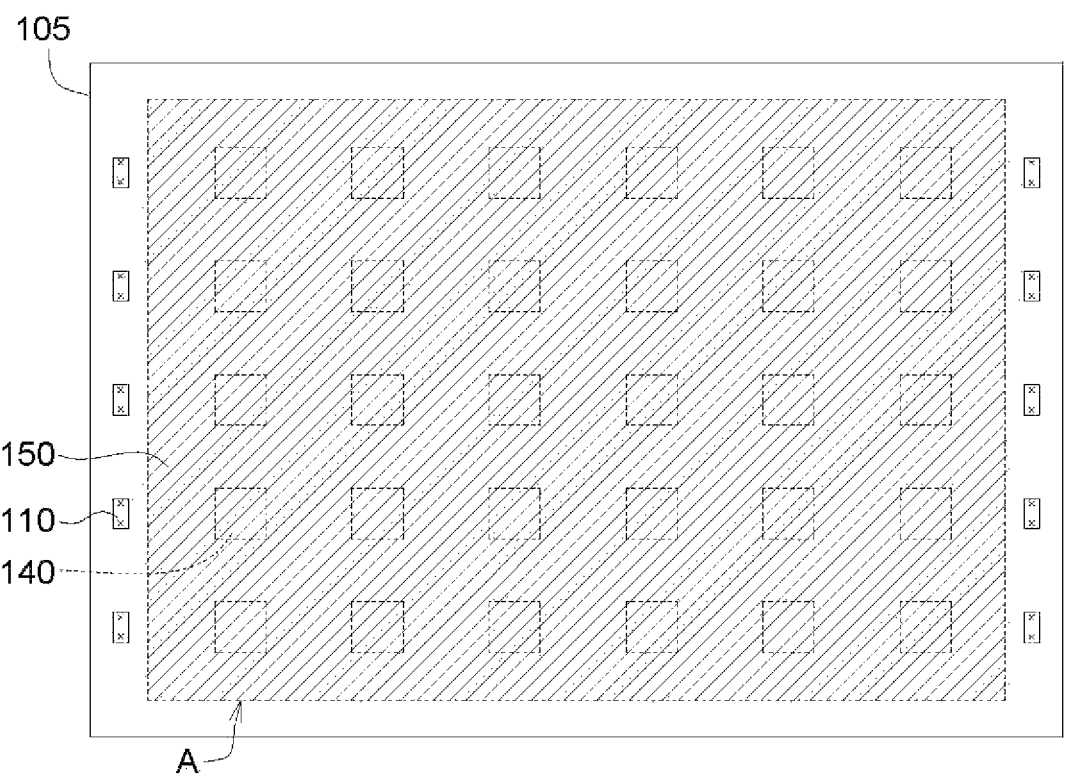
FIG. 4 illustrates another exemplary arrangement of the light source(s), the light detector(s), and the light filter.

Referring to FIG. 4, another exemplary arrangement of the light source 110, the light detector 140, and the light filter 150 is shown. As shown in FIG. 4, the fingerprint recognition device 100 may comprise a plurality of light sources 110 and a plurality of light detectors 140, and the light sources 110 and the light detectors 140 are disposed on a substrate 105 of the fingerprint recognition device 100. The light detectors 140 are arranged in a matrix and define a detection area A of the substrate 105, and the light sources 110 are arranged in columns outside the detection area A. In this arrangement, the light filter 150 may be disposed on the whole detection area A. However, the light filter 150 does not extend to the region outside the detection area A. As such, similar to the embodiment of FIG. 3, the light sources 110 are not covered by the light filter 150.

Figure 5:
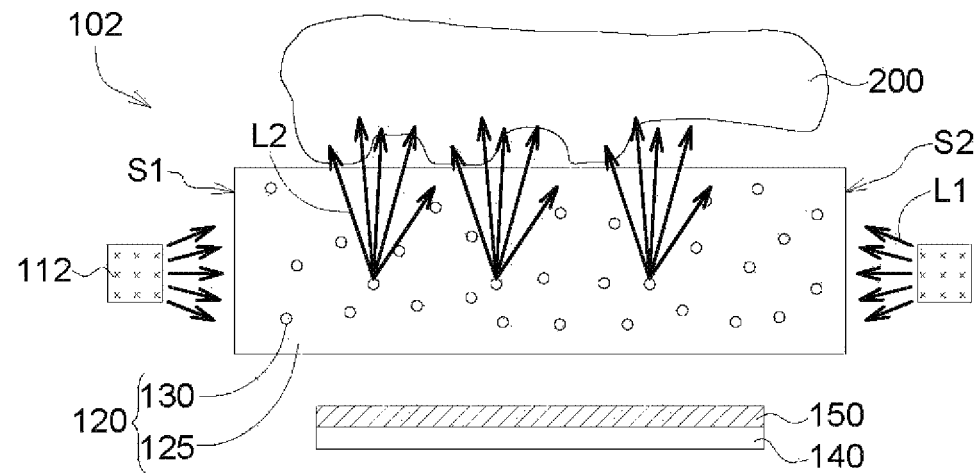
FIG. 5 illustrates another exemplary fingerprint recognition device.

Referring to FIG. 5, another exemplary fingerprint recognition device 102 is shown. The fingerprint recognition device 102 differs from the fingerprint recognition device 100, wherein the differences are shown in the fingerprint recognition device 102 where the light source 112 is disposed at a side of the light conversion layer 120. For example, the light sources 112 are disposed outside the light conversion layer 120 and adjacent to two opposite side surfaces S1 and S2 of the light conversion layer 120. As such, the first light L1 emitted from the light source 110 enters the light conversion layer 120 from a side thereof, and the first light L1 is converted to a second light L2 by the light conversion particles 130.

Figure 6:
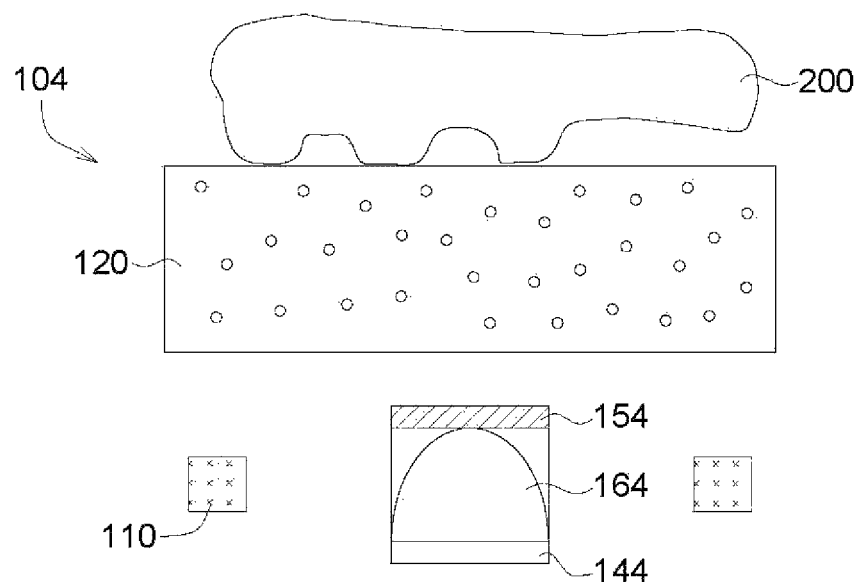
FIG. 6 illustrates still another exemplary fingerprint recognition device.

Referring to FIG. 6, another exemplary fingerprint recognition device 104 is shown. The fingerprint recognition device 104 differs from the fingerprint recognition device 100, wherein the differences are shown as that the fingerprint recognition device 104 further comprises a lens 164. The lens 164 is disposed between the light detector 144 and the light filter 154. The lens 164 is configured to focus the reflected second light L2. Because the lens 164 is used to focus the reflected second light L2, the required areas and amounts of the light detectors 144 in the fingerprint recognition device 104 can be reduced, and thereby the required areas and amounts of the light filters 154 can be reduced.

Figure 7A:
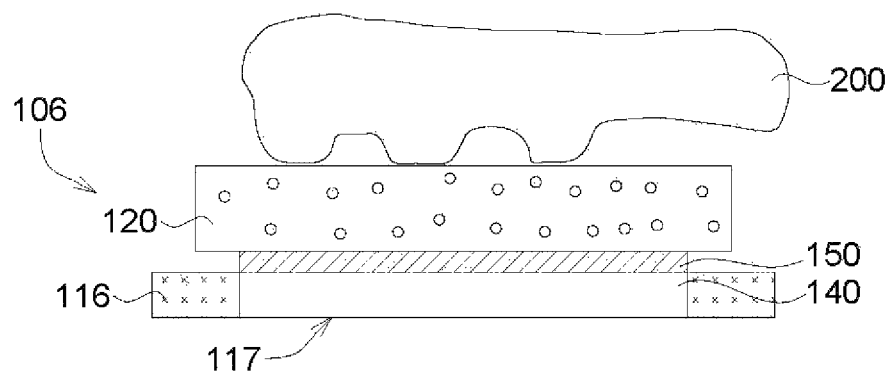
FIGS. 7A-7B illustrate still another exemplary fingerprint recognition device.
Figure 7B:
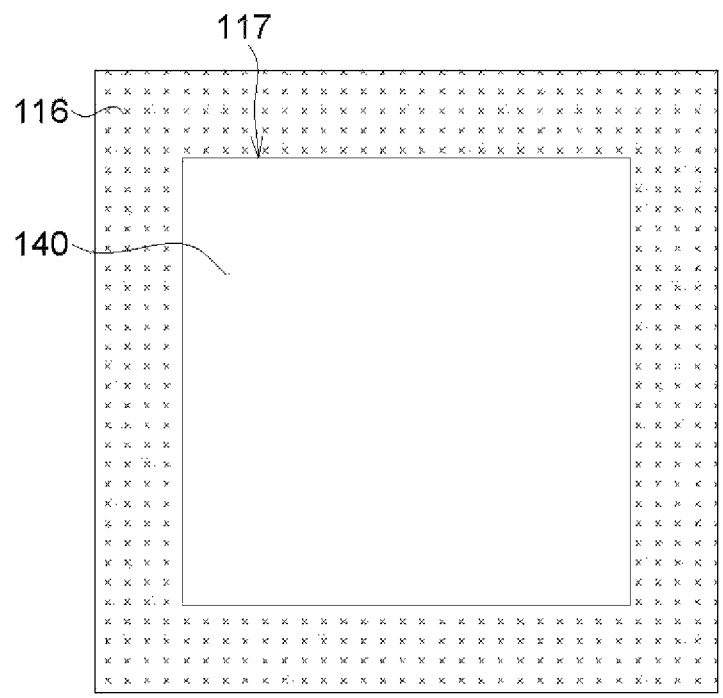

Referring to FIGS. 7A-7B, still another exemplary fingerprint recognition device 106 is shown, wherein FIG. 7A illustrates a cross sectional view of the fingerprint recognition device 106, and FIG. 7B illustrates a top view of the arrangement of the light source 116 and the light detector 140 in the fingerprint recognition device 106. The fingerprint recognition device 106 differs from the fingerprint recognition device 100, wherein the differences are shown in the fingerprint recognition device 106 where the light source 116 surrounds the light detector 140, the light source 116 defines a central opening 117, and the light detector 140 is disposed in the central opening 117. Such arrangement is beneficial for decreasing the thickness of the fingerprint recognition device. Thereby, the fingerprint recognition device 106 can be thinner than the fingerprint recognition device 100. In some further embodiments, the light source with a thinner thickness such as an electroluminescent sheet may be used. In some embodiments, one side of the light filter 150 may contact the light detector 140, and another side of the light filter 150 may contact the light conversion layer 120, as shown in FIG. 7A, so as to further decrease the thickness of the fingerprint recognition device.

Specific embodiments and comparative examples are given below so as to provide a further understanding of the fingerprint recognition device according to embodiments.

THE FIRST GROUP OF EMBODIMENTS AND COMPARATIVE EXAMPLES

First Embodiment

Figure 8:
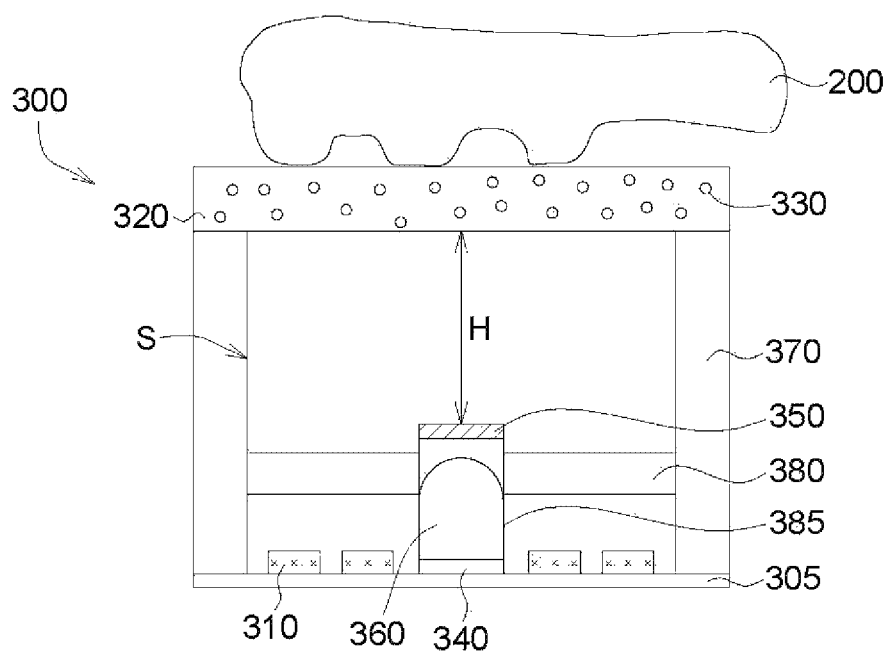
FIG. 8 illustrates the fingerprint recognition device of first embodiment.

Referring to FIG. 8, a fingerprint recognition device 300 of first embodiment ($1^{st}$ E) is shown. The fingerprint recognition device 300 has a configuration similar to the configuration of the fingerprint recognition device 104. More specifically, the fingerprint recognition device 300 comprises a light source 310, a light conversion layer 320 having light conversion particles 330, a light detector 340, a light filter 350, and a lens 360 that are similar to the light source 110, the light conversion layer 120, the light detector 140, the light filter 150, and the lens 164 described above, respectively. In this embodiment, the light source 310 is a blue light source, and the light filter 350 is a green light filter. The fingerprint recognition device 300 further comprises a substrate 305 and a frame 370. The frame 370 connects the light conversion layer 320 and the substrate 305 so as to define an accommodation space S, and the light source 310, the light detector 340, the light filter 350, and the lens 360 are disposed in the accommodation space S. The light conversion layer 320 is separated from the light filter 350 by a gap H, of which the medium is air. The gap H can be adjusted based on the focal length of the lens 360. The frame 370 may be bloomed so as to further decrease the interference of the external light and improve the recognition performance. The fingerprint recognition device 300 further comprises a fixing plate 380 and a fixing frame 385. The fixing frame 385 is configured to fix the light filter 350, the lens 360, and the light detector 340. The fixing plate 380 connects the fixing frame 385 with the frame 370. The fingerprint recognition device 300 has a total height of about 6.5 mm.

First Comparative Example

Figure 9:
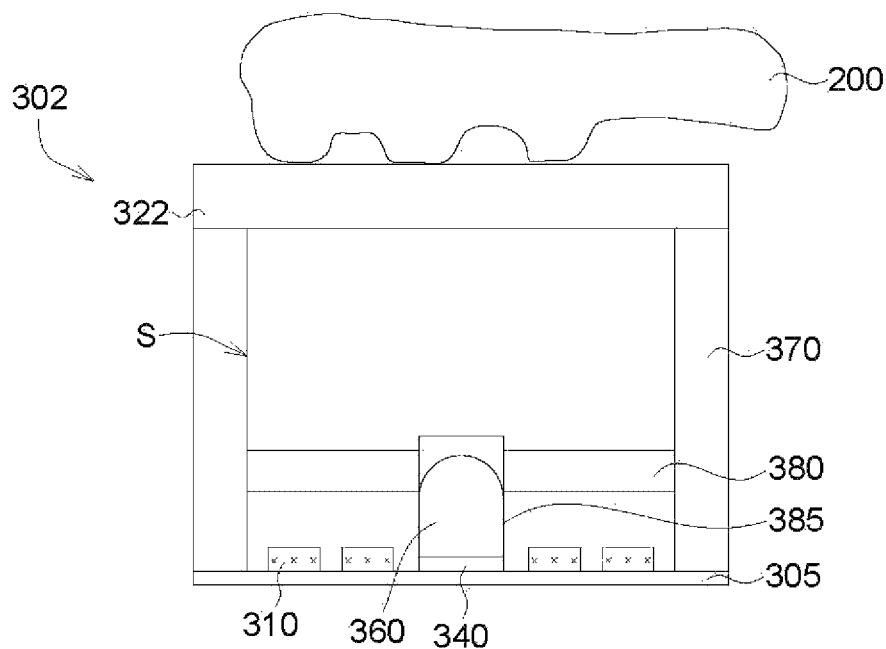
FIG. 9 illustrates the fingerprint recognition device of first comparative example.

Referring to FIG. 9, a fingerprint recognition device 302 of first comparative example ($1^{st}$ CE) is shown. The fingerprint recognition device 302 differs from the fingerprint recognition device 300 of first embodiment, wherein the differences are shown in the fingerprint recognition device 302 where a simple glass plate 322 without being processed to form particular optical structures is disposed instead of the light conversion layer 320. In addition, in the fingerprint recognition device 302, there is no light filter 350.

Second Comparative Example

Figure 10:
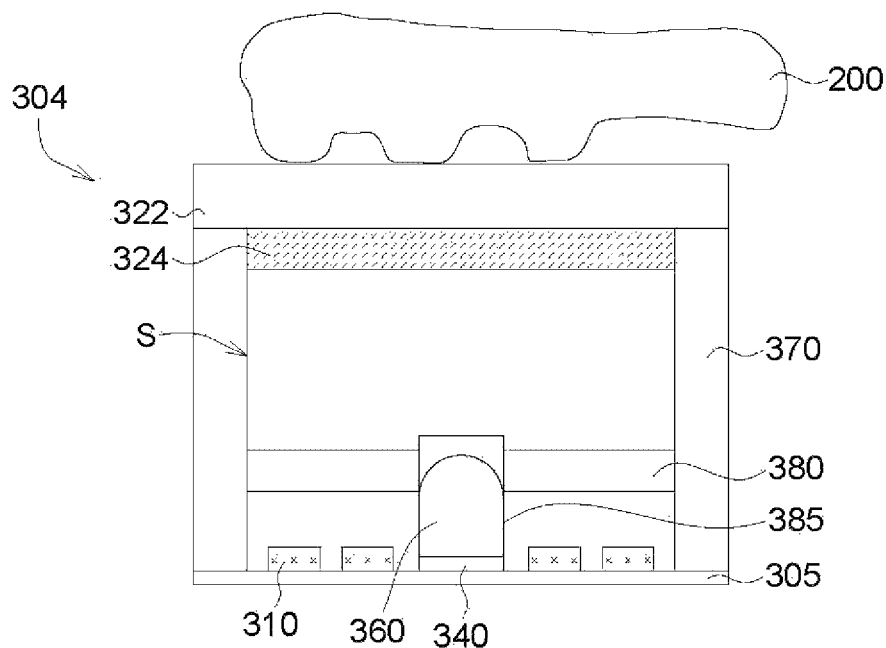
FIG. 10 illustrates the fingerprint recognition device of second comparative example.

Referring to FIG. 10, a fingerprint recognition device 304 of second comparative example ($2^{nd}$ CE) is shown. The fingerprint recognition device 304 is similar to the fingerprint recognition device 302, but further comprises a diffusion layer 324 formed under the glass plate 322.

Third Comparative Example

Figure 11:
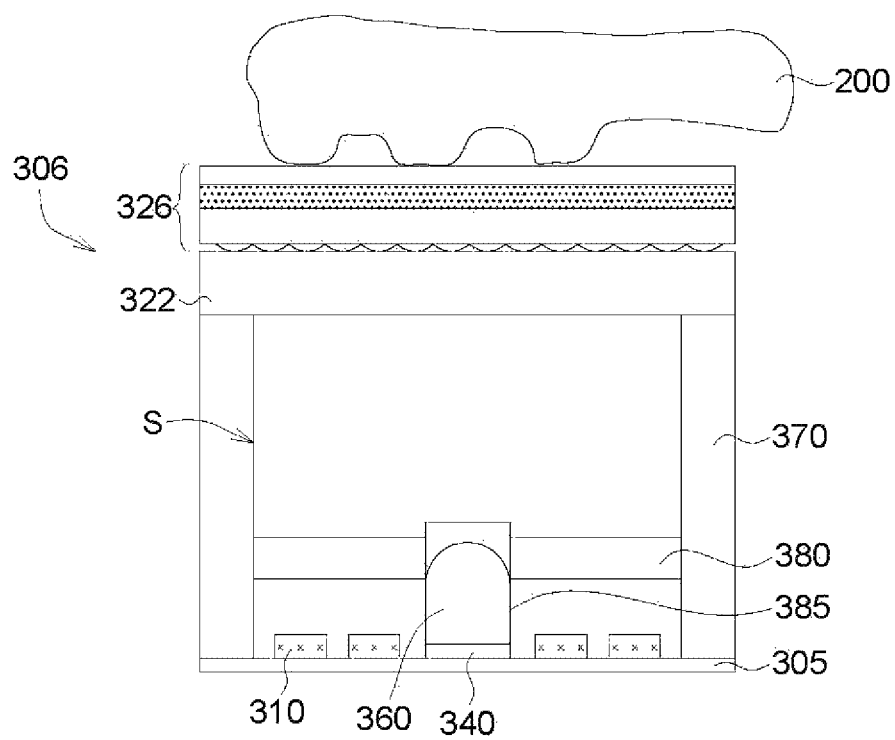
FIG. 11 illustrates the fingerprint recognition device of third comparative example.

Referring to FIG. 11, a fingerprint recognition device 306 of third comparative example ($3^{rd}$ CE) is shown. The fingerprint recognition device 306 is similar to the fingerprint recognition device 302, but further comprises a multi-layered finger pressed film 326 disposed on the glass plate 322.

Fourth Comparative Example

Figure 12:
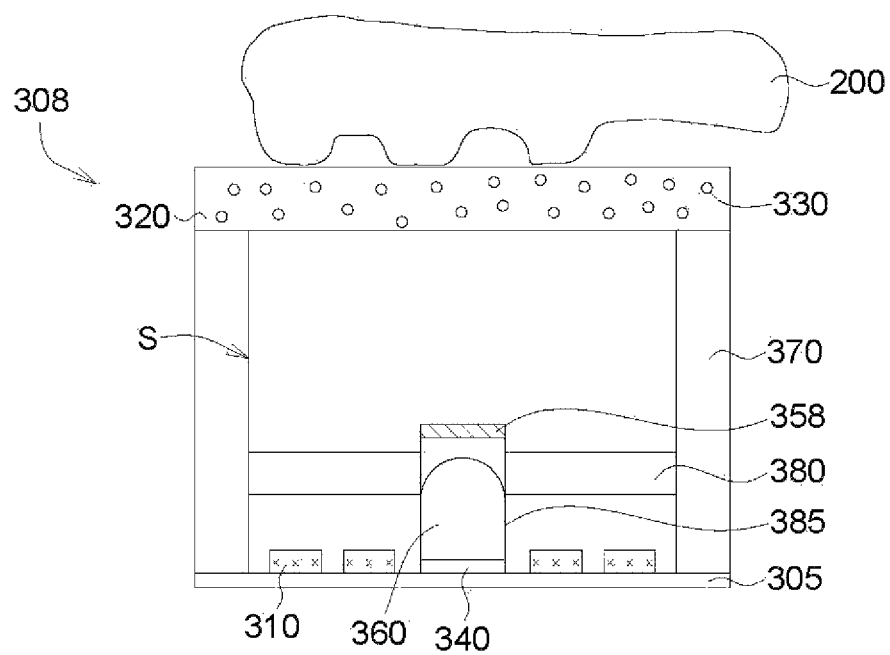
FIG. 12 illustrates the fingerprint recognition device of fourth comparative example.
Figure 13A:
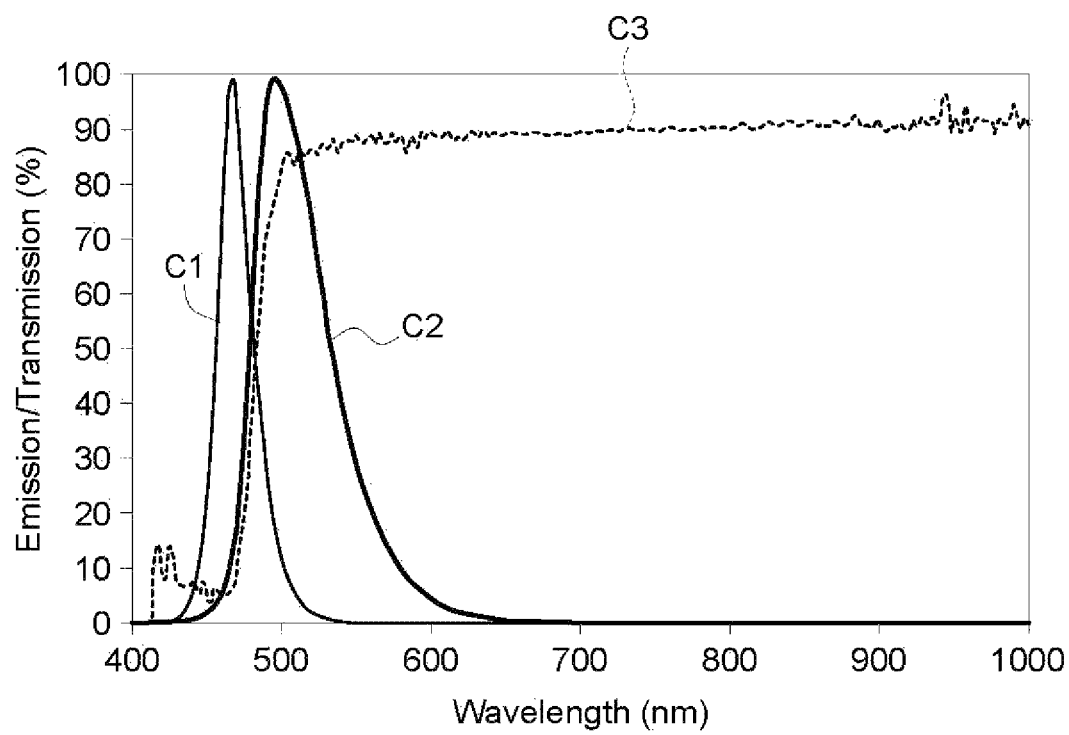
FIGS. 13A-13B show optical characteristic differences between the fingerprint recognition devices of first embodiment and fourth comparative example for illustration of the effects caused by the different components.
Figure 13B:
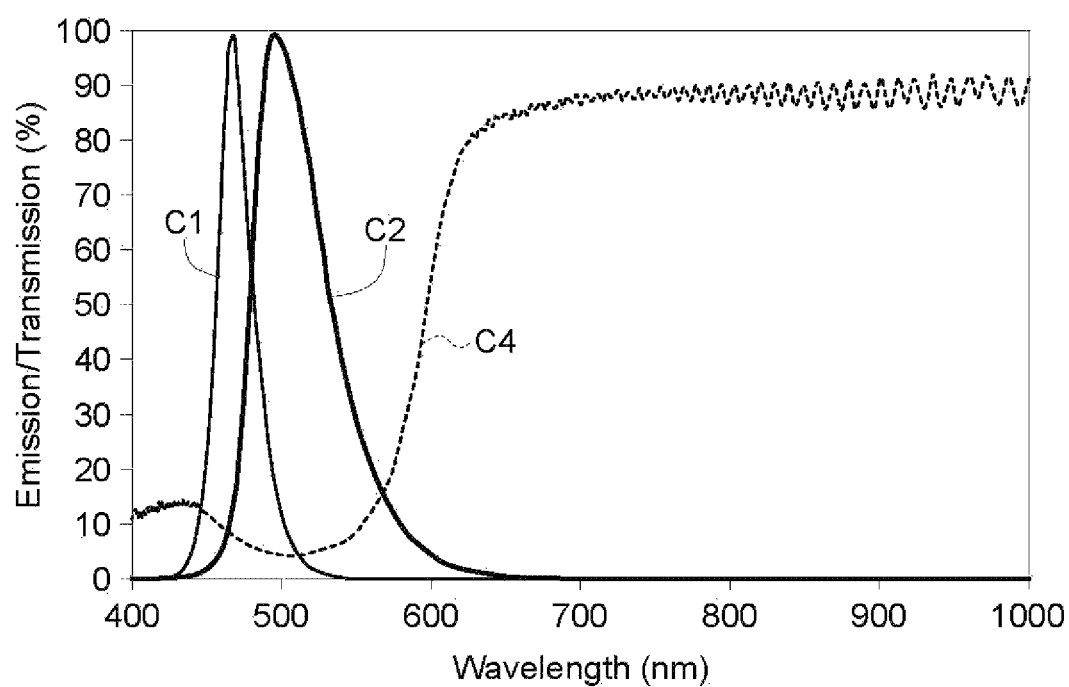

Referring to FIG. 12, a fingerprint recognition device 308 of fourth comparative example ($4^{th}$ CE) is shown. The fingerprint recognition device 308 differs from the fingerprint recognition device 300 of first embodiment, wherein the differences are shown in the fingerprint recognition device 308 where a light filter 358 different from the light filter 350 is used. The light filter 358 is a red light filter. FIGS. 13A-13B show the emission and transmission spectra of the fingerprint recognition device 300 of the first embodiment and the fingerprint recognition device 308 of the fourth comparative example, respectively. The curve C1 shows the emissivity of the light source 310 at various wavelengths, i.e., the light emission spectrum of the first light, the peak is at about 470 nm, and it may be considered as the first wavelength. The curve C2 shows the emissivity at various wavelengths of the light emitted by the light conversion particles 330 after receive the light from the light source 310, i.e., the light emission spectrum of the second light, the peak is at about 496 nm, and it may be considered as the second wavelength. The curve C3 shows the transmittance of the light filter 350 for the light at various wavelengths. The curve C4 shows the transmittance of the light filter 358 for the light at various wavelengths. It can be seen from FIG. 13A, the light filter 350 substantially allows for the passage of the second light (the light reflected by the finger). The transmittance at the peak of the second wavelength, i.e., 496 nm, is higher than 80%. In addition, the light filter 350 substantially filters out the first light (the light emitted by the light source 310). The transmittance at the peak of the first wavelength, i.e., 470 nm, is only about 10%. It can be seen from FIG. 13B, in addition to filter out most of the first light (the light emitted by the light source 310), the light filter 358 also filters out most of the second light (the light reflected by the finger). The transmittances at both the peak of the first light and the peak of the second light are only about 10%.

Test Results and Discussion of the First Group of Embodiments and Comparative Examples Fingerprint recognition is performed with the fingerprint recognition devices 300 to 308 of the first embodiment and the first to fourth comparative examples, and the images are observed. For ease of understanding the quality of imaging, a "Figure of Merit" (FoM) is defined herein based on the intensity of a fingerprint signal and a standard deviation (STDEV) of a light uniformity:

$$FoM = \frac{\text{intensity of the fingerprint signal}}{\text{STDEV of the light uniformity}}.$$

The intensity of a fingerprint signal is obtained from the (gray scale) image of the light detector 340 by measurement of the average difference between the intensities of the light reflected from the ridges and the valley in a specific distance. A larger said difference, i.e., a higher intensity of the (gray scale) image, means a clearer fingerprint. The standard deviation of a light uniformity is obtained by taking a specific area from the (gray scale) image of the light detector 340 and measuring the standard deviation of the (gray scale) image. Because the fingerprint recognition devices 300 to 308 have light detectors 340 but no light sources 310 in the center portions, if a light uniformity cannot be provided such as by a light conversion layer 320, there will be a dark spot at the center of a fingerprint image, and thereby the recognition is affected. In addition, there may be light spots at positions corresponding to the light sources 310, and thereby lead to a higher standard deviation. Therefore, FoM as defined here can reflect the quality of the fingerprint images. A higher FoM value means a better fingerprint image. The obtained intensity of the fingerprint signals and standard deviations of the light uniformity of the first group of embodiment and comparative examples are listed in Table 1 (referred to as "Intensity" and "STDEV", respectively, for simplification), so as the FoM values calculated thereby. In addition, for the quality of the fingerprint images can be distinguished in a more intuitive manner, normalization based on first comparative example (defined as 100%) is conducted, and the normalized results are listed in Table 1. The observed appearances of the images are also provided in Table 1.

TABLE 1

|  | $1^{st}$ E | $1^{st}$ CE | $2^{nd}$ CE | $3^{rd}$ CE | $4^{th}$ CE |
|---|---|---|---|---|---|
| Intensity | 13 | 12 | 0 | 14 | 7 |
| STDEV | 8.47 | 14.20 | 6.63 | 13.88 | 39.97 |
| FoM | 1.53 | 0.85 | 0 | 1.01 | 0.175 |
| Normalized FoM | 181% | 100% | 0% | 119% | 20.6% |
| Observed appearance of the image | clear image without dark or light spots | distinguishable image with dark and light spot | non-distinguishable image without dark or light spots | distinguishable image with dark and light spot | distinguishable image with dark and light spot |

Referring to Table 1, in the fingerprint recognition device 302 of first comparative example, a simple glass plate 322, which does not provide a light uniform function, is used. As such, a fingerprint image can be observed, but clear light spots and dark spots are also found. In the fingerprint recognition device 304 of second comparative example, a diffusion layer 324 that can improve the light uniformity is formed under the glass plate 322, and thereby no light or dark spots are observed. However, the light reflected by the finger is also scattered by the diffusion layer 324. As such, the light reflected by the ridges and the light reflected by the valleys are not distinguishable. No "fingerprint" image is formed. In the fingerprint recognition device 306 of third comparative example, rather than a diffusion layer 324, a finger pressed film 326 is used, and a fingerprint image can be observed. However, the finger pressed film 326 provides only poor light uniformity, and thereby clear light spots and dark spots are found, similar to the situation of first comparative example.

As for the fingerprint recognition device 308 of fourth comparative example, while the light conversion layer 320 is provided to uniformise the light, the light filter 358 used therein also filters out most of the reflected light as shown in FIG. 13B, and thereby the intensity of the fingerprint signal is decreased. In addition, the light filter 358 fails to provide enough distinguishment between the light emitted by the light source 310 and the light reflected by the finger, the signal intensity of the light to be observed and that of the noise light are almost equivalent, and thereby the fingerprint image is easily interfered by the light emitted by the light source 310. Such situation causes more serious light spots, which caused by the light source 310, and dark spots, which caused by the position of the light detector 340 that leads to the lack of a light source in the center portion. As such, the standard deviation of the light uniformity increases. All these effects lead to the decrease of the FoM value.

In the fingerprint recognition device 300 of first embodiment, the light conversion layer 320 is used to uniformise the light, and a matching light filter 350 is the selection. The light filter 350 provides good distinguishment between the light emitted by the light source 310 and the light reflected by the finger. As such, no light spots or dark spots are generated. A clear fingerprint image can be observed.

The Second Group of Embodiments and Comparative Examples

Second Embodiment

Figure 14:
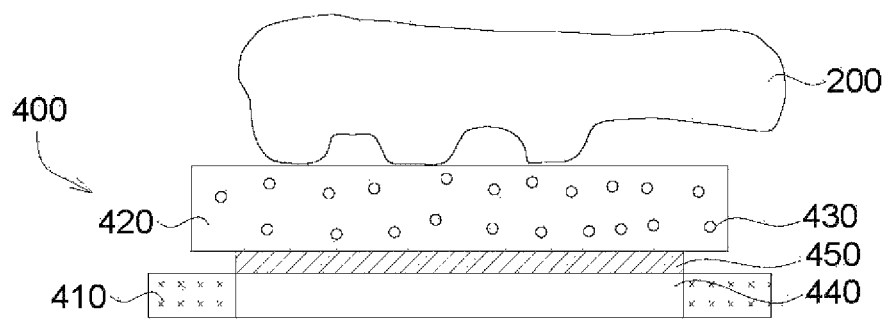
FIG. 14 illustrates the fingerprint recognition device of second embodiment.

Referring to FIG. 14, a fingerprint recognition device 400 of second embodiment ($2^{nd}$ E) is shown. The fingerprint recognition device 400 has a configuration similar to the configuration of the fingerprint recognition device 106. More specifically, the fingerprint recognition device 400 comprises a light source 410, a light conversion layer 420 having light conversion particles 430, a light detector 440, and a light filter 450 that are similar to the light source 116, the light conversion layer 120, the light detector 140, and the light filter 150 described above, respectively. In this embodiment, the light source 410 is a blue light source, and the light filter 450 is a green light filter the same as the light filter 350 used in first embodiment. Such configuration can decrease the thickness of the fingerprint recognition device. As such, the fingerprint recognition device 400 has a total height of only about 1 mm.

Fifth Comparative Example

Figure 15:
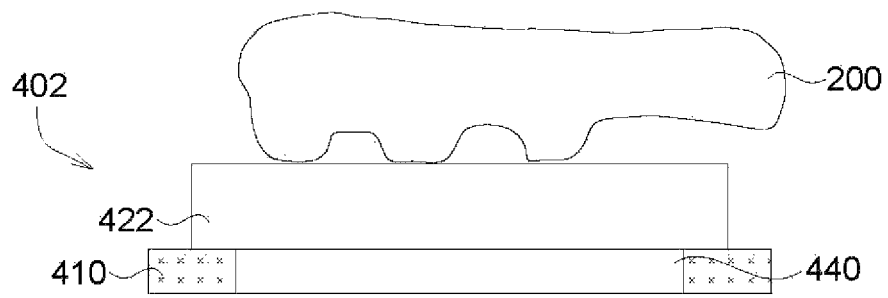
FIG. 15 illustrates the fingerprint recognition device of fifth comparative example.

Referring to FIG. 15, a fingerprint recognition device 402 of fifth comparative example ($5^{th}$ CE) is shown. The fingerprint recognition device 402 differs from the fingerprint recognition device 400 of second embodiment, wherein the differences are shown in the fingerprint recognition device 402 where a simple glass plate 422 without being processed to form particular optical structures is disposed instead of the light conversion layer 420. In addition, in the fingerprint recognition device 402, there is no light filter 450.

Test Results and Discussion of the Second Group of Embodiments and Comparative Examples Fingerprint recognition is performed with the fingerprint recognition devices 400 to 402 of second embodiment and fifth comparative example, and the images are observed. Similar to the first group of embodiment and comparative examples, the quality of imaging is reflected by FoM. The obtained intensity of the fingerprint signals and standard deviations of the light uniformity of the second group of embodiment and comparative examples are listed in Table 2 (referred to as "Intensity" and "STDEV", respectively, for simplification), so as the FoM values calculated thereby. In addition, for the quality of the fingerprint images can be distinguished in a more intuitive manner, normalization based on fifth comparative example (defined as 100%) is conducted, and the normalized results are listed in Table 2. For each observed images, the numbers of pixels corresponding to various intensities of the light are calculated so as to obtain a brightness distribution profile of the image, as shown in FIG. 16, wherein curves C5 and C6 show the brightness distribution profiles of second embodiment and fifth comparative example, respectively.

TABLE 2

|  | $2^{nd}$ E | $5^{th}$ CE |
| --- | --- | --- |
| Intensity | 10 | 9 |
| STDEV | 5.49 | 7.98 |
| FoM | 1.82 | 1.13 |
| Normalized FoM | 162% | 100% |

Figure 16:
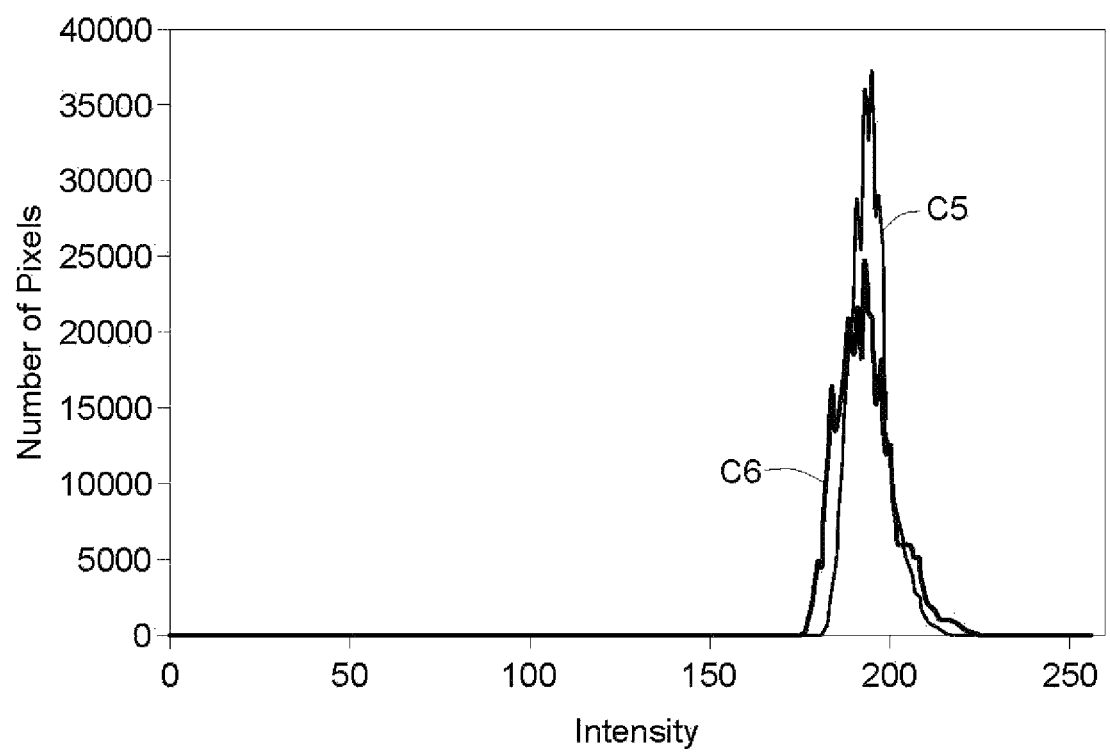
FIG. 16 shows an optical characteristic difference between the fingerprint recognition devices of second embodiment and fifth comparative example for illustration of the effects caused by the different components.

Referring to FIG. 16, the curve C5 is more concentrated than the curve C6. It means that, in an implementation in which the light conversion layer 420 is used, a brightness distribution is narrower. Referring to Table 2, in the fingerprint recognition device 400 of second embodiment, the light conversion layer 420 is used to uniformise the light. As such, a higher FoM value than that of the fingerprint recognition device 402 of fifth comparative example, and thereby a better fingerprint image, can be obtained.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A fingerprint recognition device, comprising:
   at least one light source configured to emit a first light having a first wavelength λ1;
   a light conversion layer configured to convert the first light to a second light having a second wavelength λ2 different from the first wavelength λ1;
   at least one light detector configured to detect the second light reflected by a fingerprint; and
   a light filter disposed between the light conversion layer and the at least one light detector, the light filter configured to filter out the first light and pass the second light;
   wherein the light conversion layer is separated from the light filter by a gap.

2. The fingerprint recognition device according to claim 1, further comprising:
   a lens disposed between the at least one light detector and the light filter, the lens configured to focus the second light.

3. The fingerprint recognition device according to claim 2, further comprising:
   a substrate; and
   a frame connecting the light conversion layer with the substrate to define an accommodation space, wherein the at least one light source, the at least one light detector, the light filter, and the lens are disposed in the accommodation space.

4. The fingerprint recognition device according to claim 3, further comprising:
a fixing plate; and
a fixing frame, wherein the fixing frame fixes the light filter, the lens, and the light detector, and the fixing plate connects the fixing frame with the frame.

5. The fingerprint recognition device according to claim 1, comprising a plurality of the light sources and a plurality of the light detectors disposed on a substrate of the fingerprint recognition device, wherein the light sources and the light detectors are individually arranged in columns, and the columns of the light sources and the columns of the light detectors are alternately disposed.

6. The fingerprint recognition device according to claim 1, comprising a plurality of the light sources and a plurality of the light detectors disposed on a substrate of the fingerprint recognition device, wherein the light detectors are arranged in a matrix and define a detection area of the substrate, and the light sources are arranged in columns outside the detection area.

7. The fingerprint recognition device according to claim 1, wherein the at least one light source surrounds the at least one light detector, the at least one light source defines a central opening, and the at least one light detector is disposed in the central opening.

8. The fingerprint recognition device according to claim 7, wherein the at least one light source is an electroluminescent sheet.

9. The fingerprint recognition device according to claim 1, wherein the at least one light source is a monochromatic light source.

10. The fingerprint recognition device according to claim 1, wherein the light conversion layer comprises a medium and light conversion particles dispersed in the medium, and the light conversion particles are formed of at least one of a quantum dot material, an inorganic fluorescent material, an organic fluorescent material, and a phosphor material.

11. The fingerprint recognition device according to claim 1, wherein the light conversion layer comprises a medium and light conversion particles dispersed in the medium, and the light conversion particles have particle sizes smaller than the second wavelength $\lambda 2$.

12. The fingerprint recognition device according to claim 11, wherein the particle sizes are smaller than 10 nm.

13. The fingerprint recognition device according to claim 1, wherein $\lambda 2-\lambda 1 \geq 20$ nm.

14. The fingerprint recognition device according to claim 1, wherein the light filter has a first transmittance R1 at the first wavelength $\lambda 1$ and a second transmittance R2 at the second wavelength $\lambda 2$, and R2−R1>50%.

* * * * *